United States Patent
Pulford, Jr.

[19]

[11] Patent Number: 6,146,280
[45] Date of Patent: *Nov. 14, 2000

[54] SPRING BIASED UNIVERSAL JOINT

[75] Inventor: Robert Pulford, Jr., Wolcott, Conn.

[73] Assignee: Tri-Tech, Inc., Waterbury, Conn.

[*] Notice: Under 35 U.S.C. 154(b), the term of this patent shall be extended for 541 days.

[21] Appl. No.: 08/536,654

[22] Filed: Sep. 29, 1995

[51] Int. Cl.[7] .................................................... F16D 3/16
[52] U.S. Cl. ............................................ 464/112; 464/120
[58] Field of Search .................................. 464/112, 120, 464/137, 138, 905

[56] References Cited

U.S. PATENT DOCUMENTS

| | | | |
|---|---|---|---|
| 1,037,427 | 9/1912 | Brush | 464/120 |
| 1,155,796 | 10/1915 | Cleveland | 464/120 |
| 2,381,102 | 8/1945 | Boyd | 464/120 |
| 2,526,105 | 10/1950 | Adams | 464/120 X |
| 2,923,141 | 2/1960 | Simonds | 464/905 X |
| 2,997,864 | 8/1961 | Rueb | 464/112 |
| 3,080,185 | 3/1963 | Walker | 464/120 |
| 3,098,365 | 7/1963 | Pearson | 464/120 |
| 3,406,534 | 10/1968 | Chapper | 464/119 X |
| 4,114,401 | 9/1978 | Van Hoose | 464/120 |
| 4,270,367 | 6/1981 | Snatore | 464/169 |
| 4,579,546 | 4/1986 | Pastor | 464/112 |
| 4,605,384 | 8/1986 | Kurzeja et al. | 464/905 X |
| 4,643,698 | 2/1987 | Ehrlenspiel et al. | 464/905 X |
| 4,936,701 | 6/1990 | Allen et al. | 464/120 X |

FOREIGN PATENT DOCUMENTS

| | | | |
|---|---|---|---|
| 60-65909 | 4/1985 | Japan | 464/120 |

*Primary Examiner*—Lynne H. Browne
*Assistant Examiner*—Greg Binda
*Attorney, Agent, or Firm*—John H. Crozier

[57] ABSTRACT

A flexible joint for first and second rotating members, including: a hub fixedly connected to a proximal end of the first rotating member at a first end of the hub; the hub being constructed for the insertion in a second, opposite end of the hub of a proximal end of the second rotating member, the proximal end of the second rotating member being moveable within the hub such that a distal end of the second rotating member may move axially with respect to the first rotating member and/or may move radially away from a major axis of the first rotating member; and a spring disposed between an end face of the proximal end of the second rotating member and an inner face of the hub to bias the second rotating member axially away from the hub and the first rotating member, strength of the spring determining the ease with which the distal end of the second rotating member may move.

2 Claims, 1 Drawing Sheet

SPRING BIASED UNIVERSAL JOINT

BACKGROUND OF THE INVENTION

1. Field of the Invention

The present invention relates to flexible joints for rotating members generally and, more particularly, but not by way of limitation, to a novel flexible joint especially useful for coupling a drive motor shaft to a lead screw in a linear positioning device.

2. Background Art

Flexible couplings are widely used between driving and driven shafts in rotating machinery to permit transmission of rotational motion through an angle to compensate for intentional or unintentional misalignment of the shafts and/or to compensate for operational misalignment.

Many flexible couplings, especially those which absolutely prevent any relative axial movement of the shafts are relatively expensive and, in some cases, quite heavy, the latter feature introducing considerable inertia into the system of which they are a part. Flexible couplings used to couple a drive motor shaft to a lead screw in a linear positioning device often permit an undesirable amount of relative axial movement between the motor shaft and the lead screw.

Accordingly, it is a principal object of the present invention to provide a shaft coupling that reduces relative axial movement between driving and driven shafts.

It is a further object of the invention to provide such a shaft coupling that is economical to construct.

It is an additional object of the invention to provide such a shaft coupling that is relatively lightweight and has low inertia.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a flexible joint for first and second rotating members, comprising: hub means fixedly connected to a proximal end of said first rotating member at a first end of said hub means; said hub means being constructed for the insertion in a second, opposite end of said hub means of a proximal end of said second rotating member, said proximal end of said second rotating member being moveable within said hub means such that a distal end of said second rotating member may move axially with respect to said first rotating member and/or may move radially away from a major axis of said first rotating member; and biasing means disposed between an end face of said proximal end of said second rotating member and an inner face of said hub means to bias said second rotating member axially away from said hub means and said first rotating member, strength of said biasing means determining the ease with which said distal end of said second rotating member may move.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
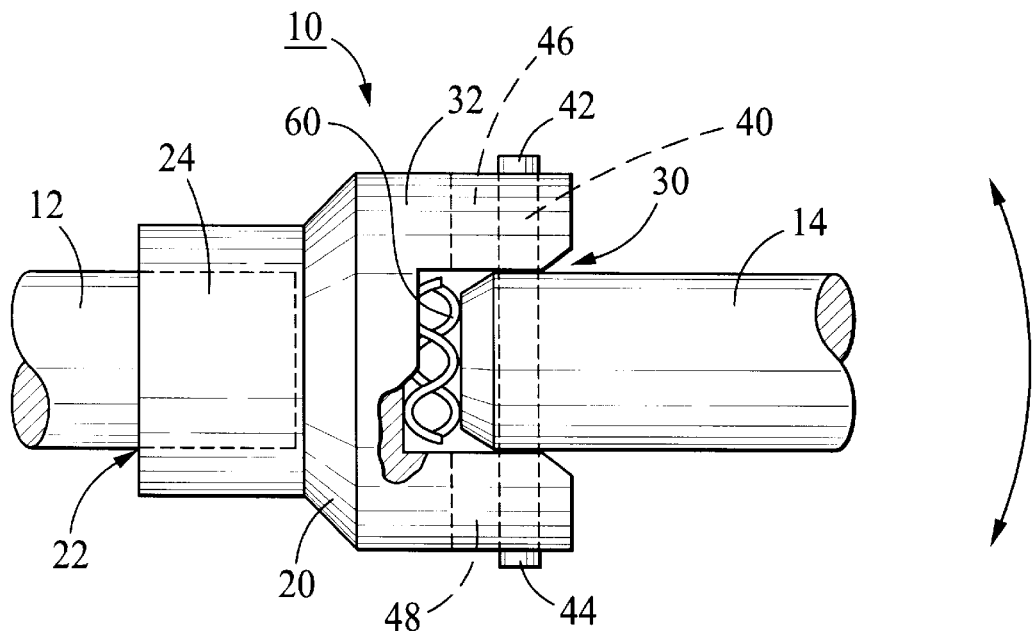
FIG. 1 is is a side elevational view, partially cut-away, of a shaft coupling constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a shaft coupling constructed according to the present invention, generally indicated by the reference numeral 10. Coupling 10 is shown joining first and second shafts 12 and 14, one of which may be assumed to be a driving shaft and the other of which may be assumed to be a driven shaft.

Coupling 10 includes a hub 20 having an axial cylindrical first channel 22 formed in a first end 24 thereof into which first channel the proximal end of first shaft 12 is pressed. Hub 20 has an axial, generally rectilinear, second channel 30 formed in a second end 32 thereof into which second channel the proximal end of second shaft 14 is inserted.

The proximal end of second shaft 14 is held in second channel 30 by means of a pin 40 which is pressed orthogonally through the second shaft and which has its ends 42 and 44 extending, respectively, through opposed, symmetrical slots 46 (FIG. 2) and 48 (FIG. 1) formed in second end 32 of hub 20, within which slots the ends of the pin can move. Thus, ends 42 and 44 of pin 40 may move axially in slots 46 and 48 to permit the distal end of second shaft 14 to move up and down, as indicated by the arrow on FIG. 1. The ease with which second shaft 14 may so move is determined by the force of a wavy spring 60 compressed between the face of the proximal end of second shaft 14 and the end surface of second channel 30. The maximum extent of such movement is determined by the engagement of second shaft 14 with the wall of second channel 30. Wavy spring 60 also prevents relative axial movement of second shaft 14 and hub 20 up to the point that the wavy spring begins to be compressed. The required strength of wavy spring 60 may be easily determined for each application.

Figure 2:
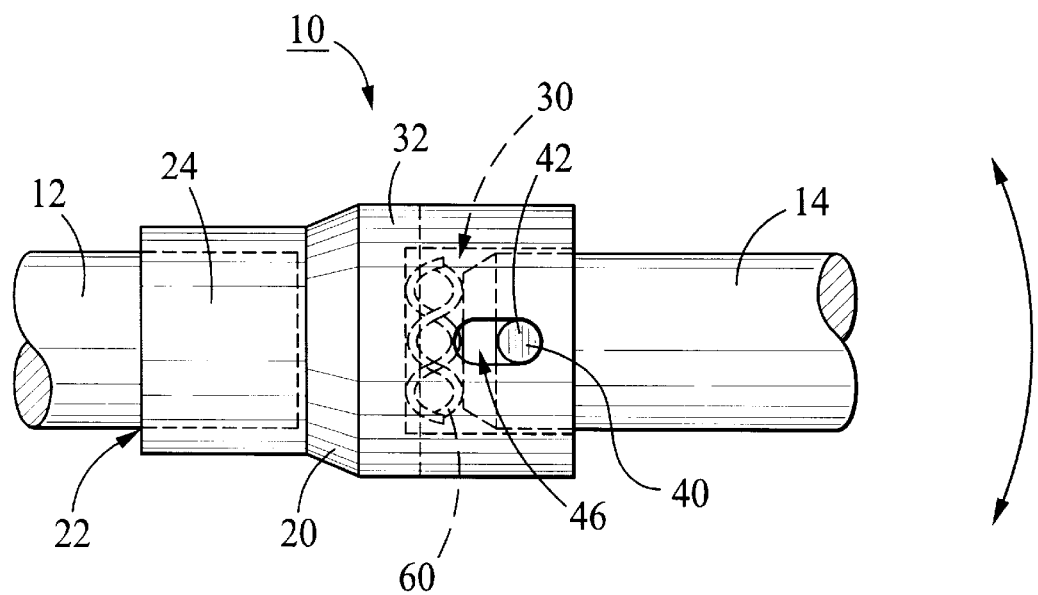
FIG. 2 is a top plan view of the shaft coupling.

Referring to FIG. 2, the distal end of second shaft 14 may also move back and forth sideways, as indicated by the arrow on that figure, by rotation of the second shaft about the central axis of pin 40. Again, the ease with which second shaft 14 may so move is determined by the force of wavy spring 60 and the maximum extent of such movement is determined by the engagement of the second shaft with the wall of second channel 30.

Movement of second shaft 14 in a plane intermediate vertical and horizontal planes will, of course, involve a combination of components of the movements indicated by the arrows on FIGS. 1 and 2. Second shaft 14 may be relatively fixed, in which case first shaft 12 would move as indicated by the arrows. Or, both first shaft 12 and second shaft 14 may share relative movement to an equal or unequal extent. Thus, coupling 10 can compensate for both installation misalignment and operational misalignment.

Coupling 10 is simple, has low parts count, and may be easily and economically constructed of any materials suitable for the intended application. Coupling 10 also is light in weight which is desirable in many linear positioning devices.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A flexible joint including first and second rotating members, comprising:

(a) a hub rigidly connected to a proximal end of said first rotating member at a first end of said hub, said hub having an opening defined in a second, opposite end thereof, with said first rotating member extending from said hub;

(b) a proximal end of said second rotating member disposed in said opening, said proximal end of said second rotating member being moveable within said opening of said hub such that a distal end of said second rotating member may move axially with respect to said first rotating member and may move radially away from a major axis of said first rotating member, and lengthwise axes of said first and second rotating members being alignable in a common straight line;

(c) biasing means disposed between an end face of said proximal end of said second rotating member and an inner face of said hub to bias said second rotating member axially away from said inner face, strength of said biasing means determining the ease with which said distal end of said second rotating member may move; and (d) a pin fixedly attached to and extending through said second rotating member, orthogonally to a major axis of said second rotating member and near said end face, said pin having ends extending into complementarily shaped slots axially defined in opposing sides of said hub, said distal end of said second rotating member being rotatable, in a first plane, about a central axis of said pin and being rotatable, in a second plane, as ends of said pin move axially within said slots, while said pin, solely, prevents removal of said proximal end of said second rotating member from said opening defined in said second end of said hub by engagement of the ends of said pin with said slots.

2. A flexible joint, as defined in claim 1, wherein: extent of radial movement of said distal end of said second rotating member away from a central axis of said first rotating member is determined by engagement of said second rotating member with internal walls of said hub.

* * * * *